(12) United States Patent
Wolfe et al.

(10) Patent No.: US 6,249,107 B1
(45) Date of Patent: Jun. 19, 2001

(54) METHOD OF CHARGING A BATTERY IN A MOBILE CHARGER

(75) Inventors: Stephen Nicholas Wolfe; Brian Thomas Pozsgay, both of Lawrenceville; Martin Hague Ramsden, Lilburn; Bradley Eugene Long, Lawrenceville, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/670,906

(22) Filed: Sep. 28, 2000

(51) Int. Cl.[7] .................................................. H01M 10/44
(52) U.S. Cl. ........................................... 320/150; 320/125
(58) Field of Search ..................................... 320/125, 137, 320/150, 151, 153, 160

(56) References Cited

U.S. PATENT DOCUMENTS 4,816,737 * 3/1989 Delmas et al. .

5,583,871 * 12/1996 Simmonds et al. .

* cited by examiner

Primary Examiner—Edward H. Tso
(74) Attorney, Agent, or Firm—Philip H. Burrus, IV

(57) ABSTRACT

A method of charging a battery, and particularly a nickel battery, in a mobile charger, such as a vehicular charger, which is subjected to elevated temperatures. The method includes the steps of a first charging of the battery until a temperature inflection occurs, and then ceasing the charging while the battery temperature stabilizes. Then the battery is charged a second time, and a parameter is monitored for an indication of a full charge, such as temperature inflection or voltage cut-off. Preferably, when the battery reaches an elevated temperature, the charging is ceased until the battery stabilizes, and the charger monitors either temperature inflection, voltage cut-off, or a Coulomb count to determine when the battery has a full charge.

10 Claims, 2 Drawing Sheets

METHOD OF CHARGING A BATTERY IN A MOBILE CHARGER

TECHNICAL FIELD

The present invention generally relates to rechargeable batteries and methods to recharge them. More particularly, the present invention relates to a method of recharging a rechargeable nickel-battery in a vehicular charger.

BACKGROUND OF THE INVENTION

Rechargeable batteries are cells which can be repeatedly charged to an electric capacity and then selectively discharged. A common element of rechargeable batteries is nickel, such as in nickel-cadmium (Ni—Cd) batteries. The charging phase of a nickel battery to a specific capacity is typically controlled by a microprocessor and charging is terminated upon the occurrence of one of four events: (1) "Voltage Cut-off": when a terminal cell voltage is reached, the charging is stopped; (2) "Temperature Cut-off": when the absolute temperature of a cell is outside a "proper charging window" (generally 5–50° C.), the charging is stopped; (3) "Coulomb Counting": if the energy put into the battery by the charger exceeds a predetermined amount, the charging is stopped; and (4) "Temperature inflection."

The detection of temperature inflection method for effecting charging termination utilizes the fact that, as a battery charges, its temperature increases. From the initial charge to nearly a full charge, the temperature of the nickel battery rises at a moderate rate. When the battery reaches full capacity, the temperature begins to rise faster. This increase in temperature rise is called an "inflection," and thus, when an inflection is detected, charging should be terminated as the battery is at full capacity.

Temperature inflection is the most efficient indicator of a fully charged battery. And typically, temperature cut-off, voltage cut-off, and Coulomb counting are used as secondary indicators that the battery is fully charged. Unfortunately, the use of temperature inflection to detect the charge level of the battery is not accurate in all environments. Consequently, in mobile battery chargers, such as those used in vehicles, extreme and changing ambient temperatures can interfere with this normal charging method of using temperature inflection to determine when to cease charging the battery.

There are several problems that arise particularly in vehicular chargers due to the elevated and fluctuating temperatures which can be present. One problem is a rising battery temperature due to rising ambient temperature, which causes a false temperature inflection. Another problem with high ambient temperatures is that if the ambient temperature is close to, but does not exceed the maximum charging temperature, a temperature cut-off termination will occur. The early charging termination causes an insufficient charge to be placed within the battery.

Accordingly, it would be advantageous to have a method of charging a rechargeable battery, and particularly a nickel battery, which allows adequate charging of the battery under the various environmental conditions that mobile chargers encounter. It is therefore to the provision of such an improved method of charging a rechargeable battery in a mobile charger that the present invention is primarily directed.

DETAILED DESCRIPTION OF THE INVENTION

Figure 1:
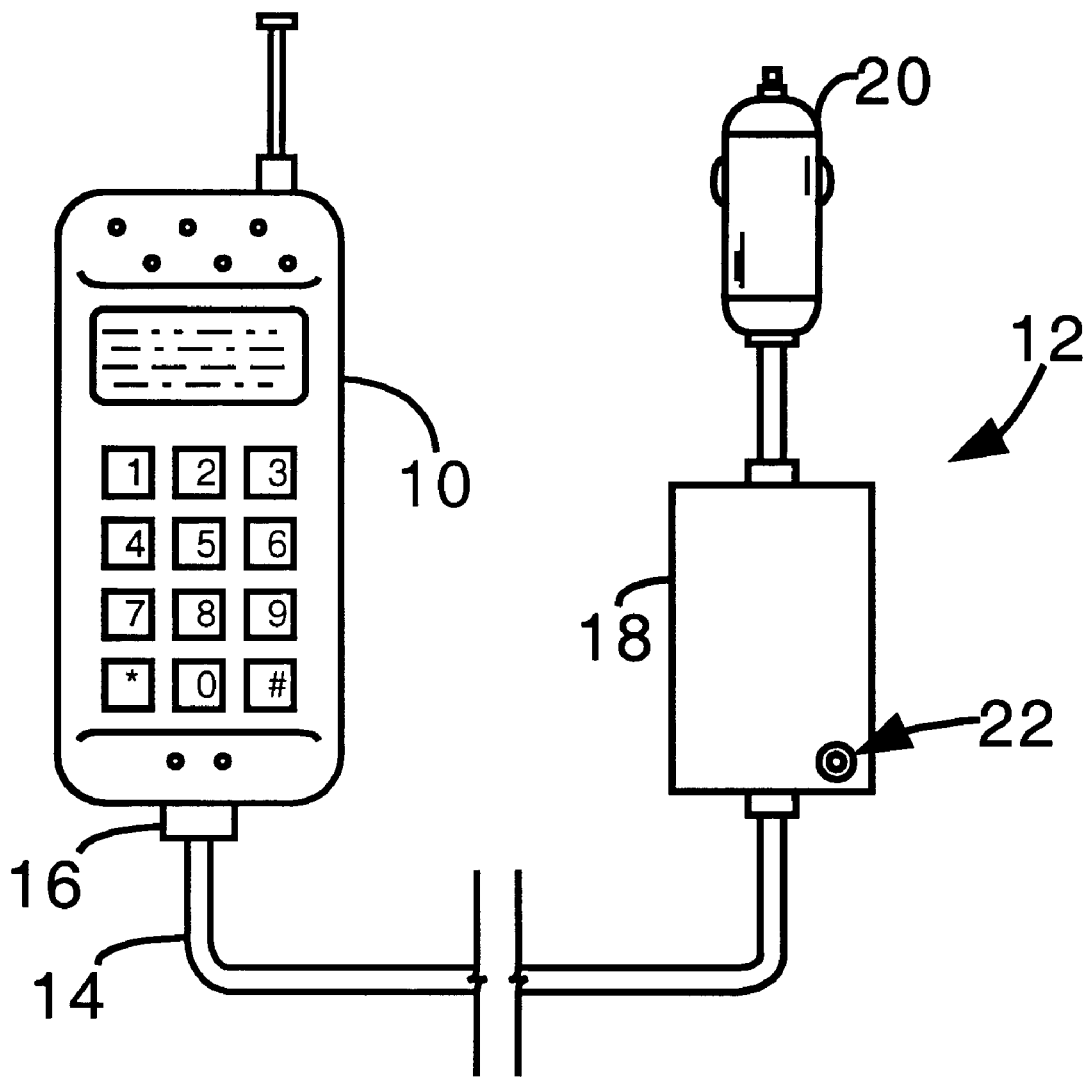
FIG. 1 is a perspective view of a cellular phone connected to a mobile charger, and the cellular telephone includes a rechargeable battery.

With reference to the figures in which like numerals represent like elements throughout, FIG. 1 illustrates a cellular telephone 10, which includes a rechargeable nickel battery component as is well known in the art, connected to a mobile charger 12, shown here as a vehicular charger that plugs into a cigarette lighter socket of an automobile. The mobile charger 12 has a cord 14 that is selectively conductively coupled to the cellular phone 10 at a plug 16, and charging of the battery of the cellular phone 10 is controlled by a charger control 18, such that the battery of the cellular phone 10 can be charged in the automobile when the socket insert 20 is placed within the cigarette lighter socket. There are many variants of the vehicular charger known in the art and the illustrated embodiment is merely exemplary of a charger which can execute the present inventive method. Further, the charger control can be resident in the cellular telephone 10 and thus the resident charger control of the cellular telephone will control the rate and profile of charging, from any power source.

The charger control 18 typically includes a microprocessor that controls the specific charging, profile for the battery of the cellular telephone 10. The charger control 18 also includes an indicator light 22 that provides visual information on the charging status of the battery. The indicator light 22 is a common component on a mobile charger 12 and can relay the specific charging stages of the mobile charger 12 while the steps of the method progress. Moreover, other mobile chargers as known in the art include sound-producing, capabilities that can audibly alert a person of the charging condition of the battery.

Figure 2:
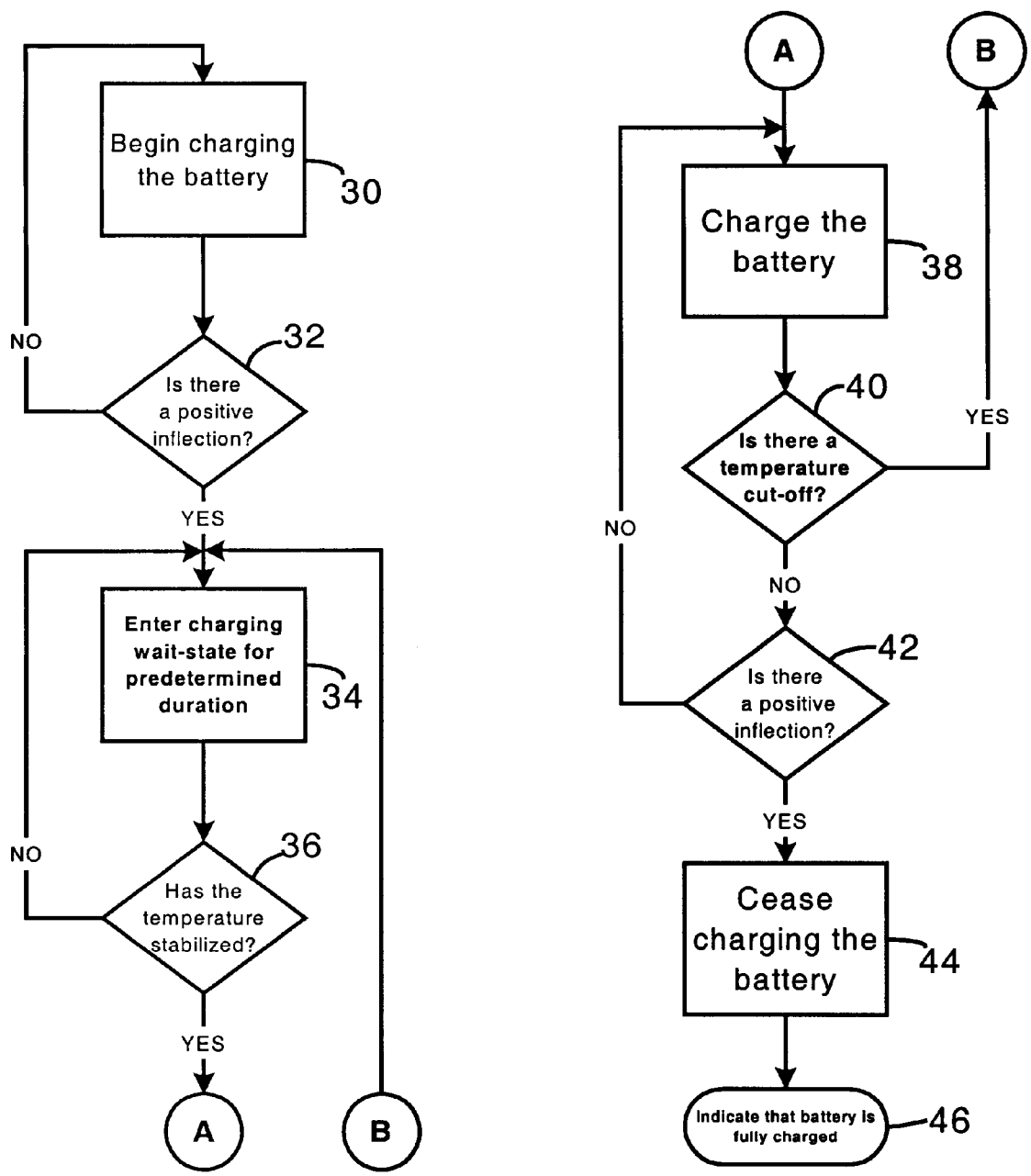
FIG. 2 is a flowchart illustrating the preferred algorithm of charging a rechargeable nickel battery in a mobile charger.

With reference to FIG. 2, the inventive method for charging the battery of the cellular telephone 10 in a vehicular environment is illustrated. The method is preferably a charging, algorithm that is executed on the charger controller 18, but can also be resident on a charger controller integrated with the cellular telephone 10. The method applies at least two charge sequences to a Nickel battery to insure proper indication of a fully-charged battery when the battery is being charged Linder constant or periodic elevated temperatures. The first charging, of the battery imparts at least some charge into the battery before a false temperature inflection or temperature cut-off occurs, which gives the battery some charge in case the battery must be used before the entire charging process can be completed. With existing charging, methods, if the battery is at a high initial temperature, a typical charger will wait to charge the battery only after the battery temperature stabilizes, which requires the user to wait for the full charging cycle to complete in order to have the charged battery available.

The method includes the step of placing the battery in conductive contact with a mobile charger, such as attaching the cellular phone 10 to the mobile charger 12, and then first charging of the battery, as shown at step 30. The battery is first monitored to determine if there is a temperature inflection, as shown at decision 32. Upon detecting a temperature inflection in the battery, the first charging of the battery is ceased and the battery enters a charging wait-state for a predetermined duration, as shown at step 34. If no temperature inflection is detected, the battery continues to be charged at step 30 and monitored at decision 32.

The predetermined duration of the charging, wait-state will vary based upon the type of battery being charged, the ambient temperature around the battery, and the temperature the battery initially reached in the first charging. An exemplary wait-state may be 30 seconds until the battery stabilizes such that it can be charged a second or further time.

After the charging wait-state (step 34), the battery is monitored to determined when the battery has in fact stabilized, as shown at decision 36, and can be charged a second time. The second monitoring of the battery thus determines when the battery lowers to or below a predetermined temperature that will vary based upon the particular battery design. If the battery has not stabilized at a lower temperature, the wait-state is reentered and then once again monitored for temperature stabilization after a wait period. Of course, the wait-period can be very short in duration such that the processor is repeatedly holding the charge and monitoring the battery temperature, even in cycles of less than one second.

Upon the battery reaching the predetermined temperature or below the predetermined temperature, a second charging of the battery occurs as shown at step 38. The battery is subjected to a third monitoring to determine when the battery is fully charged, as shown at decision 40. In the embodiment shown in FIG. 2, the second monitoring is to determine if the temperature increases too drastically such that the charging-wait state (step 34) must again be reentered and the battery monitored for stabilization (decision 36) before charging can once again resume. Therefore, in such embodiment, in addition to the third monitoring of the battery for a temperature cut-off (decision 40), there is a fourth monitoring step to determine if the battery is fully charged, as shown at decision 42, which is shown here as detecting a temperature inflection in the battery. Upon determining the battery is fully charged, such as detecting a temperature inflection at decision 42, the second or additional charging of the battery is ceased, as shown at step 44. An indication is then given that the battery is charged and the charging process is ended, as shown at termination 46, which can be flashing the indicator light 22 on the charger control 18 of mobile charger 12.

It can thus be seen that the second charging phase can be monitored for solely a second temperature inflection to cease the second charging of the battery. Alternately, the second monitoring of the battery can be to cause a temperature cut-off of the battery if it heats to much during the second charging, and have the battery once again enter charging-wait state (step 34) until charging can resume. Once charging can resume, then the battery is constantly monitored in case of temperature cut-off (decision 40) and also to determine if the battery is fully charged (decision 42) such that no further charging is required. The monitoring method to actually determine if the battery is fully charged can be other methods as are known in the art, such as voltage cut-off and Coulomb count.

The inventive charging method consequently resolves several of the problems encountered in charging the battery in elevated temperature conditions. The primary advantage is the reversion to a charging wait-state each time a temperature cut-off occurs, and then the application of a further charge to the battery until a different indication occurs that the battery is charged, such as the detection of temperature inflection, voltage cut-off, or Coulomb count. This prevents a premature termination of the charging such that the battery does not receive a charge to full capacity.

Additionally, other charges such as a maintenance charge or a trickle charge can be applied to the battery after the initial charging phase has been terminated. These types of charges are well known in the art for maintaining the charge level of the battery. Furthermore, these types of maintenance charges are not at a significant capacity such that the temperature of the battery will be dramatically affected.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A method of charging a battery in a mobile charger, comprising the steps of:

placing the battery in conductive contact with a mobile charger;

a first charging of the battery;

a first monitoring of the battery for a temperature inflection;

upon detecting a temperature inflection in the battery, ceasing the first charging of the battery;

a second monitoring of the battery to determine when the battery lowers to or below a predetermined temperature;

upon the battery reaching the predetermined temperature or below the predetermined temperature, a second charging of the battery;

a third monitoring of the battery to determine when the battery is fully charged; and upon determining the battery is fully charged, ceasing the second charging of the battery.

2. The method of claim 1, wherein the step of a third monitoring of the battery is monitoring the battery for a temperature inflection.

3. The method of claim 1, wherein the step of a third monitoring of the battery is monitoring the battery for a voltage cut-off.

4. The method of claim 1, wherein the step of a third monitoring of the battery is monitoring the battery for a Coulomb count.

5. The method of claim 1, wherein the step of a third monitoring of the battery is monitoring the battery for a temperature cut-off.

6. The method of claim 5, further comprising the steps of:

upon determining a temperature cut-off, ceasing the second charging of the battery and returning to the second monitoring step;

a fourth monitoring of the battery to determine if the battery is fully charged; and upon determining the battery is fully charged, ceasing the additional charging of the battery.

7. The method of claim 6, wherein the step of a fourth monitoring of the battery is monitoring a battery for a voltage cut-off.

8. The method of claim 6, wherein the step of a fourth monitoring of the battery is monitoring a battery for a Coulomb count.

9. The method of claim 6, wherein the step of a fourth monitoring of the battery is monitoring a battery for a temperature inflection.

10. The method of claim 1, wherein the method of charging a battery in a mobile charger is charging a nickel battery in a vehicular battery charger.

* * * * *